(12) United States Patent
Chen et al.

(10) Patent No.: US 9,171,460 B2
(45) Date of Patent: *Oct. 27, 2015

(54) SYSTEMS AND METHODS FOR COLLECTING INFORMATION FROM VEHICLE DEVICES VIA A VEHICLE DATA BUS

(71) Applicant: CalAmp Corp., Oxnard, CA (US)

(72) Inventors: Gallin Chen, Irvine, CA (US); Radhakrishnan Ramachandran, San Diego, CA (US)

(73) Assignee: CalAmp Corp., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,287

(22) Filed: Jun. 27, 2014

(65) Prior Publication Data

US 2014/0309843 A1    Oct. 16, 2014

Related U.S. Application Data

(63) Continuation of application No. 13/332,848, filed on Dec. 21, 2011, now Pat. No. 8,812,173.

(60) Provisional application No. 61/425,702, filed on Dec. 21, 2010.

(51) Int. Cl.
   *G08G 1/01* (2006.01)
   *G06Q 10/08* (2012.01)

(52) U.S. Cl.
   CPC .............. *G08G 1/0112* (2013.01); *G06Q 10/08* (2013.01)

(58) Field of Classification Search
   USPC ............................................................ 701/1
   See application file for complete search history.

(56) References Cited

U.S. PATENT DOCUMENTS

| | | | |
|---|---|---|---|
| 6,085,151 A * | 7/2000 | Farmer et al. | 701/301 |
| 6,346,876 B1 | 2/2002 | Flick | |
| 6,401,027 B1 * | 6/2002 | Xu et al. | 701/117 |
| 6,737,989 B2 | 5/2004 | Flick | |
| 6,756,885 B1 | 6/2004 | Flick | |
| 6,812,888 B2 * | 11/2004 | Drury et al. | 342/357.31 |
| 7,015,830 B2 * | 3/2006 | Flick | 340/989 |

(Continued)

OTHER PUBLICATIONS

Road vehicles—Diagnostic Systems—Part 2: CARB requirements for interchange of digital information, ISO 9141-2, 1994, 18 pgs.

(Continued)

*Primary Examiner* — Thomas Tarcza
*Assistant Examiner* — Alex C Dunn
(74) *Attorney, Agent, or Firm* — KPPB LLP (57) ABSTRACT

Systems and methods in accordance with embodiments of the invention continuously collecting information via a vehicle data bus, store the information in a database, and retrieve the information in response to requests from remote devices. One embodiment includes a vehicle position determining device, a wireless communications device, and a controller spaced apart from the at least one operable vehicle device and connected to the vehicle data bus so that the vehicle data bus extends from said controller to the at least one operable vehicle device. The controller is configured to query the at least one vehicle device via the vehicle data bus and store the information provided in a database, and receive requests for information from a remote device via the wireless communications device, query the database for the requested information and send the requested information to the remote device via the wireless communications device.

20 Claims, 4 Drawing Sheets

(56) References Cited

U.S. PATENT DOCUMENTS

| | | | |
|---|---|---|---|
| 7,085,637 B2* | 8/2006 | Breed et al. | 701/38 |
| 7,110,880 B2* | 9/2006 | Breed et al. | 701/482 |
| 7,250,850 B2* | 7/2007 | Mizutani | 340/435 |
| 7,671,727 B2 | 3/2010 | Flick | |
| 8,032,278 B2 | 10/2011 | Flick | |
| 2012/0158211 A1 | 6/2012 | Chen et al. | |

OTHER PUBLICATIONS

Surface Vehicle Recommended Practice, E/E Diagnostic Test Modes, Dec. 1991, 32 pgs.

Surface Vehicle Recommended Practice, Universal Interface for OBD II Scan, Jun. 30, 1993, 45 pgs.

Surface Vehicle Recommended Practice; OBD II Scan Tool, Mar. 1992, 14 pgs.

* cited by examiner

SYSTEMS AND METHODS FOR COLLECTING INFORMATION FROM VEHICLE DEVICES VIA A VEHICLE DATA BUS

CROSS-REFERENCE TO RELATED APPLICATIONS

The present application is a continuation of U.S. patent application Ser. No. 13/332,848, filed Dec. 21, 2011, which application claimed priority to U.S. Provisional Application 61/425,702, filed Dec. 21, 2010, the entirety of which are hereby incorporated by reference.

FIELD OF THE INVENTION

The present invention relates generally to vehicle telematics systems and more specifically to the collection of data from devices connected to a vehicle bus using a vehicle telematics system and the transmission of collected data to remote devices using the vehicle telematics system.

BACKGROUND

A vehicle telematics system is typically a system installed in a vehicle that is capable of determining the location of the vehicle and communicating the vehicle's location to a remote location via a wireless communication link. Vehicle telematics systems are installed in a variety of applications including, but not limited to, fleet management, vehicle finance, vehicle maintenance, driver management, and/or fuel management.

A variety of vehicle telematics systems that are configured to connect with the vehicle bus of a vehicle are described in a series of related patents and patent applications, on which Kenneth E. Flick is named as an inventor. The "Background of the Invention" section of U.S. Pat. No. 5,719,551 to Flick entitled "Vehicle Security System for a Vehicle Having a Data Communications Bus" filed Aug. 22, 1996, acknowledges that vehicle data buses were well known at the time of the filing of the patent and asserts that conventional vehicle security systems were not readily adaptable to a vehicle including a data communication bus. U.S. Pat. No. 5,719,551 illustrates a variety of techniques for connecting a vehicle security system to a vehicle data bus and discloses a method for remotely controlling a vehicle function for a vehicle of a type including a data communications bus connecting a plurality of vehicle devices, the method involving receiving a signal at the vehicle from a remote transmitter so that the vehicle function controller remotely controls a vehicle function responsive to the remote transmitter (see col. 8, lines 51-65).

The "Background of the Invention" section of U.S. Pat. No. 6,512,465 to Flick entitled "Vehicle Tracker Including Stationary Time Determination and Associated Methods" filed May 17, 2001, which claims priority to a number of provisional applications filed on or after May 17, 2000, acknowledges that systems existed at that time to enable the tracking of vehicles via the Internet. U.S. Pat. No. 6,512,465 discloses a vehicle tracking system. In addition, U.S. Pat. No. 6,512,465 discloses that the tracking device may communicate with one or more other vehicle devices via a vehicle data communications bus using the techniques described in U.S. Pat. No. 5,719,551 and U.S. Pat. No. 6,011,460, which is a continuation of U.S. Pat. No. 5,719,551.

U.S. Pat. No. 6,924,750 entitled "Vehicle Tracking Unit for Controlling Operable Vehicle Devices Using a Vehicle Data Bus" filed Mar. 25, 2002, which is a continuation-in-part of U.S. Pat. No. 6,512,465, includes a significant amount of additional disclosure relative to U.S. Pat. No. 6,512,465 concerning the connection of a vehicle tracking system in which a vehicle tracking unit interfaces with a vehicle data bus. Some of the disclosure that was added to U.S. Pat. No. 6,924,750 is as follows (col. 37, lines 1-49):

In an alternate embodiment of the invention illustratively shown in FIG. 36, the vehicle 21 may include a vehicle data bus 360 extending throughout the vehicle and which is connected to one or more operable vehicle devices. As illustratively shown, such operable vehicle devices may include the vehicle alarm indicator 67 (e.g., horn, siren, etc.), a keyless entry device, the engine starter interrupt device 66, the remote start device 63, the door lock actuator 62, and the vehicle security controller 28, although others may also be included as will be appreciated by those of skill in the art. Furthermore, other devices to be monitored, such as the ignition switch 65, may also be connected to the vehicle data bus 360, for example.

Furthermore, one or more of the operable vehicle devices may be responsive to at least one data bus code received on the vehicle data bus 360. More particularly, each of the above listed operable vehicle devices may have one or more unique data bus codes assigned thereto which, when received, cause a respective operable vehicle device to perform a particular function, as will be understood by those skilled in the art.

As such, a method according to the present invention is illustratively shown in FIG. 37 in which, beginning at Block 370, the controller 40 generates at least one data bus code on the vehicle data bus 360 to control at least one operable vehicle device based upon a command signal received by the wireless communications device 44, at Blocks 371 and 372. Accordingly, the user may not only use the vehicle tracking unit 25 to control numerous vehicle devices, but separate connections between such devices and the controller 40 need not be made. Instead, each of the operable vehicle devices may conveniently be connected to the vehicle data bus 360, which may make the installation thereof easier.

In some embodiments, the command signal received by the wireless communications device 44 may include the at least one data bus code. Alternately, the command signal may relate to the at least one data bus code, and the controller 40 may process the command signal to generate the at least one data bus code on the vehicle data bus 360, as will be understood by those skilled in the art.

Further, the command signal may be provided by the monitoring station 30, and the controller 40 may optionally cooperate with the wireless communications device 44 to send a response message to the monitoring station based upon receiving the command signal, at Block 373, thus ending the method (Block 374). By way of example, the wireless communications device 44 may receive the vehicle data bus device code via a wireless pager network, although other suitable communications formats may also be used.

DESCRIPTION OF THE DRAWINGS

Figure 1:
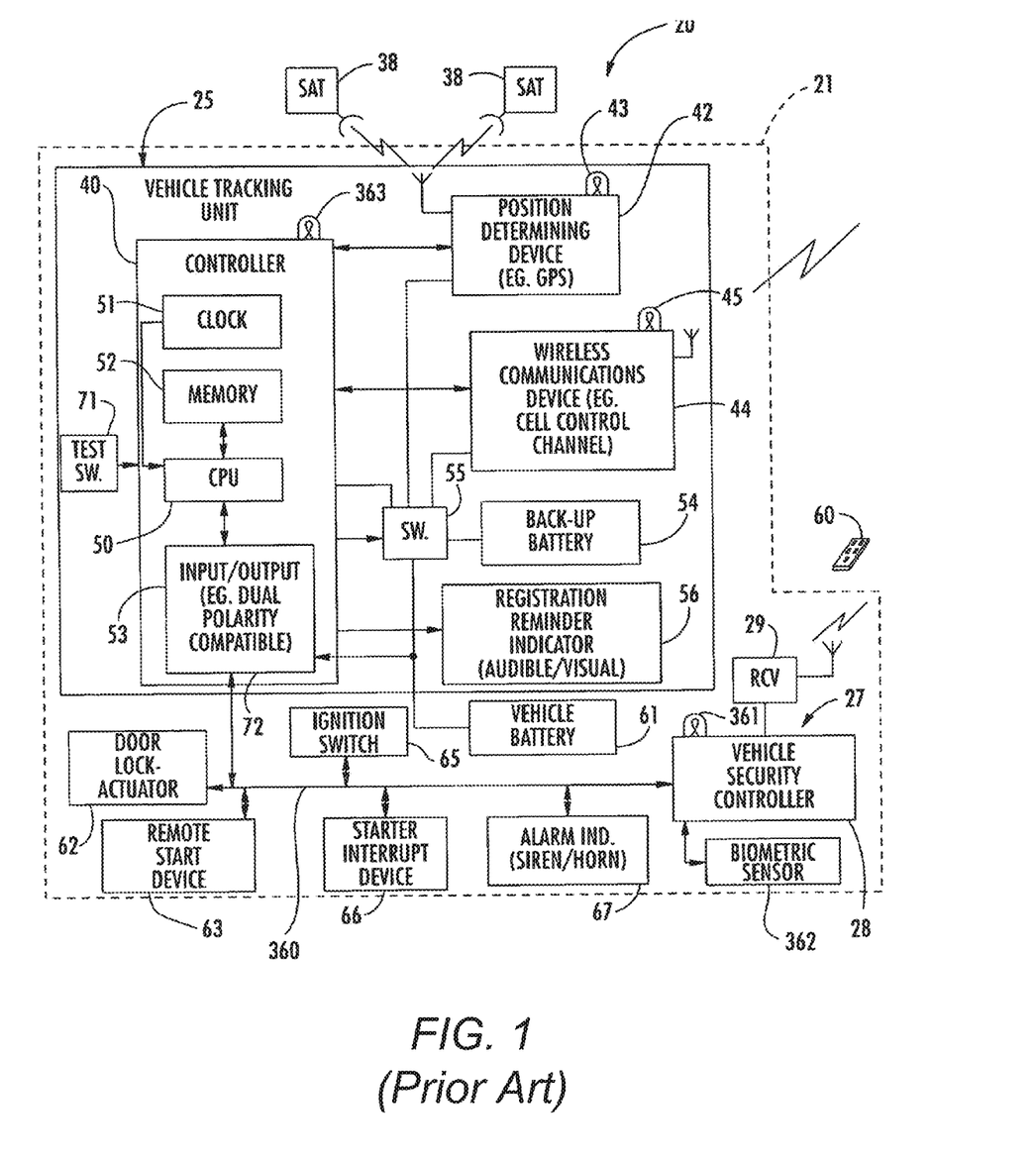
FIG. 1 illustrates a schematic block diagram of a vehicle including a prior art vehicle tracking unit connected to a vehicle data bus.
Figure 2:
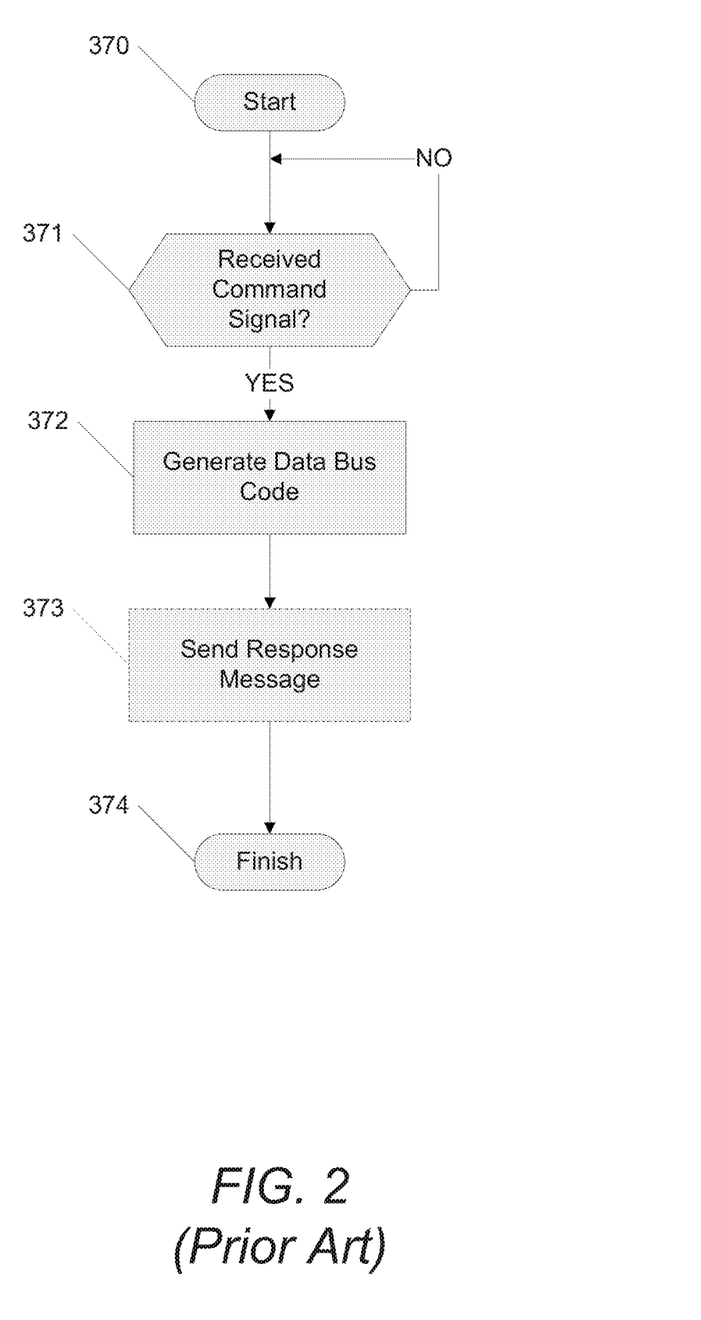
FIG. 2 is a flow chart illustrating a prior art process for controlling operable vehicle devices using the vehicle tracking unit and vehicle data bus shown in FIG. 1.

FIG. 1 illustrates the vehicle tracking unit illustrated in FIG. 36 of U.S. Pat. No. 6,924,750. FIG. 2 illustrates the method shown in FIG. 37 of U.S. Pat. No. 6,924,750. Neither FIG. 36 nor 37 appeared in U.S. Pat. No. 6,512,495.

The disclosures of each of U.S. Pat. Nos. 5,719,551, 6,011,460, 6,512,465, and 6,924,750 are incorporated by reference herein in their entirety.

SUMMARY OF THE INVENTION

Systems and methods in accordance with embodiments of the invention continuously collecting information from vehicle devices via a vehicle data bus, store the information in a database, and retrieve the information from the database in response to requests from remote devices. One embodiment includes a vehicle position determining device, a wireless communications device, and a controller spaced apart from the at least one operable vehicle device and connected to the vehicle data bus so that the vehicle data bus extends from said controller to the at least one operable vehicle device. In addition, the controller is configured to query the at least one vehicle device via the vehicle data bus and store the information provided by the at least one vehicle device in a database, and receive requests for information from a remote device via the wireless communications device, query the database for the requested information and send the requested information to the remote device via the wireless communications device.

A further embodiment of the invention also includes memory. In addition, the controller is configured to store the database in the memory.

In another embodiment of the invention, the information provided by the at least one vehicle device includes at least one piece of information selected from a group including: Vehicle Speed; Engine Speed; Fuel Rate; Trip Fuel Consumption; Trip Odometer; Ignition Status; Malfunction Indicator Lamp Status; Diagnostic Trouble Codes; Power Take Off Status; Engine Coolant Monitor; Throttle Position; Battery Voltage; A/C System Monitor; Catalyst Monitor; Comprehensive Component Monitor; EGR System Monitor; Evaporative System Monitor; Fuel System Monitor; Heated Catalyst Monitor; Misfire Monitor; Oxygen Sensor Monitor; Oxygen Sensor Heater Monitor; Secondary Air Monitor; Fuel Rate; Trip Fuel Consumption; Battery Voltage; Brake Position/Switch Status; Odometer; Seatbelt Fastened; Cruise Control Status; Fuel Level; Transmission Gear; Turn Signal Status; Accelerator Position; Tire Pressure; Oil Life; Airbag Status; Acceleration/Deceleration; and Vehicle Security Alarm Status.

In a still further embodiment of the invention, the controller is configured to periodically query the at least one vehicle device.

In still another embodiment of the invention, the controller is configured to determine the at least one vehicle device to query based upon a piece of information previously received by the controller.

In a yet further embodiment of the invention, the request for information from the remote device is a request for a specific piece of information.

In yet another embodiment of the invention, the request for information from the remote device is a request for multiple pieces of information.

In a further embodiment again of the invention, the request for information from the remote device is a request for a piece of information that is calculated by the controller using information retrieved from the database.

In another embodiment again of the invention, the controller is configured to determine location using the vehicle position determining device and to provide location information to a remote device via the wireless communications device.

A further additional embodiment of the invention includes a wireless communications device, and a controller configured to connect to the vehicle data bus. In addition, the controller is configured to query the at least one vehicle device via the vehicle data bus and store the information provided by the at least one vehicle device in a database, and receive requests for information from a remote device via the wireless communications device, query the database for the requested information and send the requested information to the remote device via the wireless communications device.

A still yet further embodiment of the invention includes querying the at least one vehicle device using a vehicle tracking device, adding information received from the at least one vehicle device in response to the query to a database maintained by the vehicle tracking device, receiving a request for information from a remote device via the vehicle tracking device, querying the database using the vehicle tracking device to obtain the requested information, and sending the requested information to the remote device using the vehicle tracking device.

In still yet another embodiment of the invention, the information received from the at least one vehicle device includes at least one piece of information selected from a group including: Vehicle Speed; Engine Speed; Fuel Rate; Trip Fuel Consumption; Trip Odometer; Ignition Status; Malfunction Indicator Lamp Status; Diagnostic Trouble Codes; Power Take Off Status; Engine Coolant Monitor; Throttle Position; Battery Voltage; A/C System Monitor; Catalyst Monitor; Comprehensive Component Monitor; EGR System Monitor; Evaporative System Monitor; Fuel System Monitor; Heated Catalyst Monitor; Misfire Monitor; Oxygen Sensor Monitor; Oxygen Sensor Heater Monitor; Secondary Air Monitor; Fuel Rate; Trip Fuel Consumption; Battery Voltage; Brake Position/Switch Status; Odometer; Seatbelt Fastened; Cruise Control Status; Fuel Level; Transmission Gear; Turn Signal Status; Accelerator Position; Tire Pressure; Oil Life; Airbag Status; Acceleration/Deceleration; and Vehicle Security Alarm Status.

In a still further embodiment again of the invention, querying the at least one vehicle device using a vehicle tracking device includes periodically querying the at least one vehicle device using the vehicle tracking device.

In still another embodiment again of the invention, querying the at least one vehicle device using the vehicle tracking device includes determining at least one vehicle device to query based upon a piece of information previously received by the controller.

In a still further additional embodiment of the invention, the request for information from the remote device is a request for a specific piece of information.

In still another additional embodiment of the invention, the request for information from the remote device is a request for multiple pieces of information.

In a yet further additional embodiment of the invention, the request for information from the remote device is a request for a piece of information that is generated by analyzing information retrieved from the database using the vehicle tracking device.

Yet another additional embodiment of the invention also includes determining location using the vehicle tracking device, and providing location information to a remote device via the vehicle tracking device.

Another further embodiment of the invention includes a machine readable medium containing controller instructions, where execution of the instructions by a controller causes the controller to perform a process including querying the at least one vehicle device, adding information received from the at least one vehicle device in response to the query to a database, receiving a request for information from a remote device via a wireless communications device, querying the database to obtain the requested information, and sending the requested information to the remote device via a wireless communications device.

In another further embodiment again, the machine readable medium is non-volatile memory.

DETAILED DESCRIPTION OF THE INVENTION

Turning now to the drawings, systems and methods for continuously collecting information from vehicle devices via a vehicle data bus, storing the information in a database, and retrieving the information from the database in response to requests from remote devices in accordance with embodiments of the invention are illustrated. A number of prior art systems involve the connection of a vehicle tracking unit to a vehicle data bus so that the vehicle tracking unit can place at least one data bus code on the vehicle data bus to control at least one operable vehicle device based upon a command signal received via a wireless communication link. Vehicle tracking units in accordance with embodiments of the invention are configured to connect to the vehicle data bus, but do not place data bus codes on the vehicle data bus in response to command signals received via a wireless communication link. Instead, the vehicle tracking units place codes on the vehicle data bus independently of commands received via the wireless communication link. In many embodiments, a vehicle tracking unit continuously collects data from various vehicle devices connected to a vehicle data bus and records the collected data in a local database or an equivalent data structure that facilitates the retrieval of information. In several embodiments, the local database is stored in the memory of the vehicle tracking unit. When the vehicle tracking unit receives a command from a remote device via the wireless communication link, the vehicle tracking unit determines the information requested by the remote device and queries the local database to provide an answer to the remote device via the via wireless communication link. In this way, the vehicle tracking units' collection of information from vehicle devices and response to commands received via the wireless communication link are independent. In addition, the vehicle tracking unit can gather location information using a vehicle position determining device and provide location information to remote devices via a wireless communications device. Various embodiments of vehicle tracking units in accordance with embodiments of the invention are discussed further below.

Vehicle Tracking Units

Any of a variety of vehicle tracking units can be utilized in accordance with embodiments of the invention including the prior art vehicle tracking unit illustrated in FIG. 1. The vehicle tracking unit illustrated in FIG. 1 includes a controller 40 including memory 52, input/output circuitry 53 configured to connect the vehicle tracking unit to a vehicle data bus 360, a position determining device 42 such as a GPS receiver, and a wireless communications device 44. The vehicle tracking unit is configured to communicate with vehicle devices via the vehicle data bus 360, and with remote devices via a wireless communication link using the wireless communications device. The vehicle tracking unit can determine its location using the position determining device 42 and can report its location to a remote device via the wireless communication device 44. In many embodiments, a response to a request for information from a remote device includes a location report from the vehicle tracking unit. Although a specific vehicle tracking unit is illustrated in FIG. 1, any of a number of different vehicle tracking units appropriate to specific applications can be utilized in accordance with embodiments of the invention.

Collection of Information from Vehicle Devices

A variety of vehicle devices communicate via the vehicle data bus in modern vehicles. A vehicle tracking unit in accordance with embodiments of the invention can query the vehicle devices using commands communicated to the vehicle devices via the vehicle data bus. Information that can be collected includes but is not limited to the vehicle identification or VIN number, information from an engine management system, information from an emission control system including but not limited to: Vehicle Speed; Engine Speed; Fuel Rate; Trip Fuel Consumption; Trip Odometer; Ignition Status; Malfunction Indicator Lamp Status; Diagnostic Trouble Codes; Power Take Off Status; Engine Coolant Monitor; Throttle Position; Battery Voltage; A/C System Monitor; Catalyst Monitor; Comprehensive Component Monitor; EGR System Monitor; Evaporative System Monitor; Fuel System Monitor; Heated Catalyst Monitor; Misfire Monitor; Oxygen Sensor Monitor; Oxygen Sensor Heater Monitor; Secondary Air Monitor; Fuel Rate; Trip Fuel Consumption; Battery Voltage; Brake Position/Switch Status; Odometer; Seatbelt Fastened; Cruise Control Status; Fuel Level; Transmission Gear; Turn Signal Status; Accelerator Position; Tire Pressure; Oil Life; Airbag Status; Acceleration/Deceleration; and Vehicle Security Alarm Status.

The vehicle tracking unit can store the information provided by the vehicle devices for retrieval. In many embodiments, the vehicle tracking unit stores the information in a local database. The local database can be stored in the memory of the controller or in another storage device. In a number of embodiments, the vehicle tracking unit collects information from vehicle devices by querying specific vehicle devices in accordance with a predetermined schedule. In several embodiments, the vehicle tracking unit determines the information to collect in real time based upon the information that has already been collected by the vehicle tracking unit.

Figure 3:
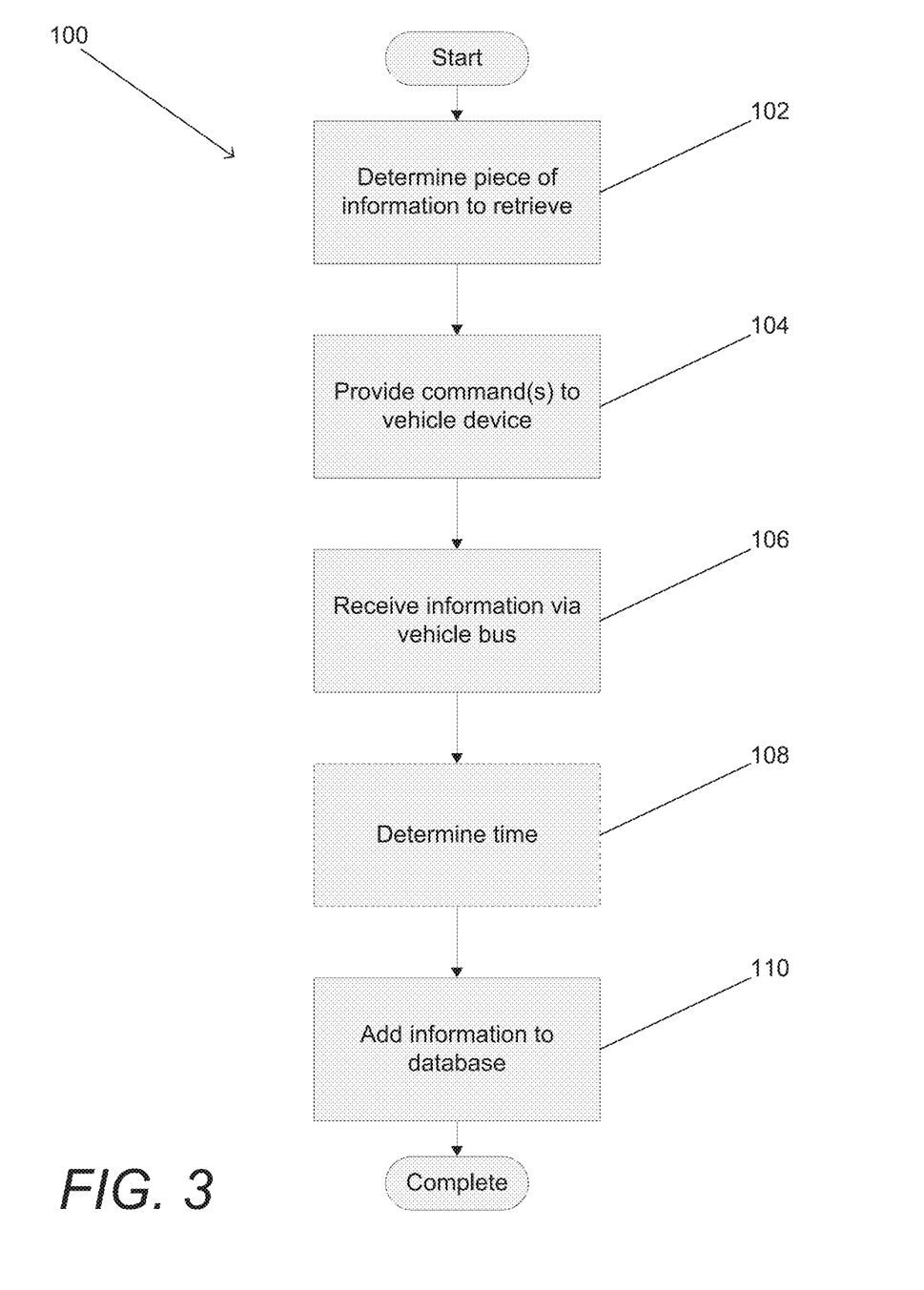
FIG. 3 is a flow chart illustrating a process for collecting data from vehicle devices and storing the data in accordance with an embodiment of the invention.

A process for obtaining vehicle data via a vehicle data bus and adding it to a local database stored on a vehicle tracking unit in accordance with an embodiment of the invention is illustrated in FIG. 3. The process 100 involves determining (102) a specified piece of information to be retrieved from a vehicle device for inclusion in the database, providing (104) at least one command to the vehicle device via the vehicle data bus to request the specified piece of information, receiving (106) the specified piece of information from the vehicle device via the vehicle data bus, and adding (108) the specified piece of information to the database. In many embodiments, the process also involves determining (107) a time to associate with the data provided by the vehicle device according to a reference clock and associating a time stamp with the specified information in the database. Although a specific process is shown in FIG. 3, any of a variety of processes for obtaining specific pieces of information from vehicle devices via a data bus and storing the specified pieces of information within a local database stored on a vehicle tracking unit appropriate to specific applications can be utilized in accordance with embodiments of the invention.

Responding to Requests for Information

Vehicle tracking units in accordance with embodiments of the invention store information retrieved from vehicle devices in a local database. When a request for information is received via a wireless communication link from a remote device, the vehicle tracking unit can query the database to provide the requested information. In this way, the vehicle tracking unit is able to immediately retrieve the requested information (if available), and/or utilize historical information in responding to the remote device.

Figure 4:
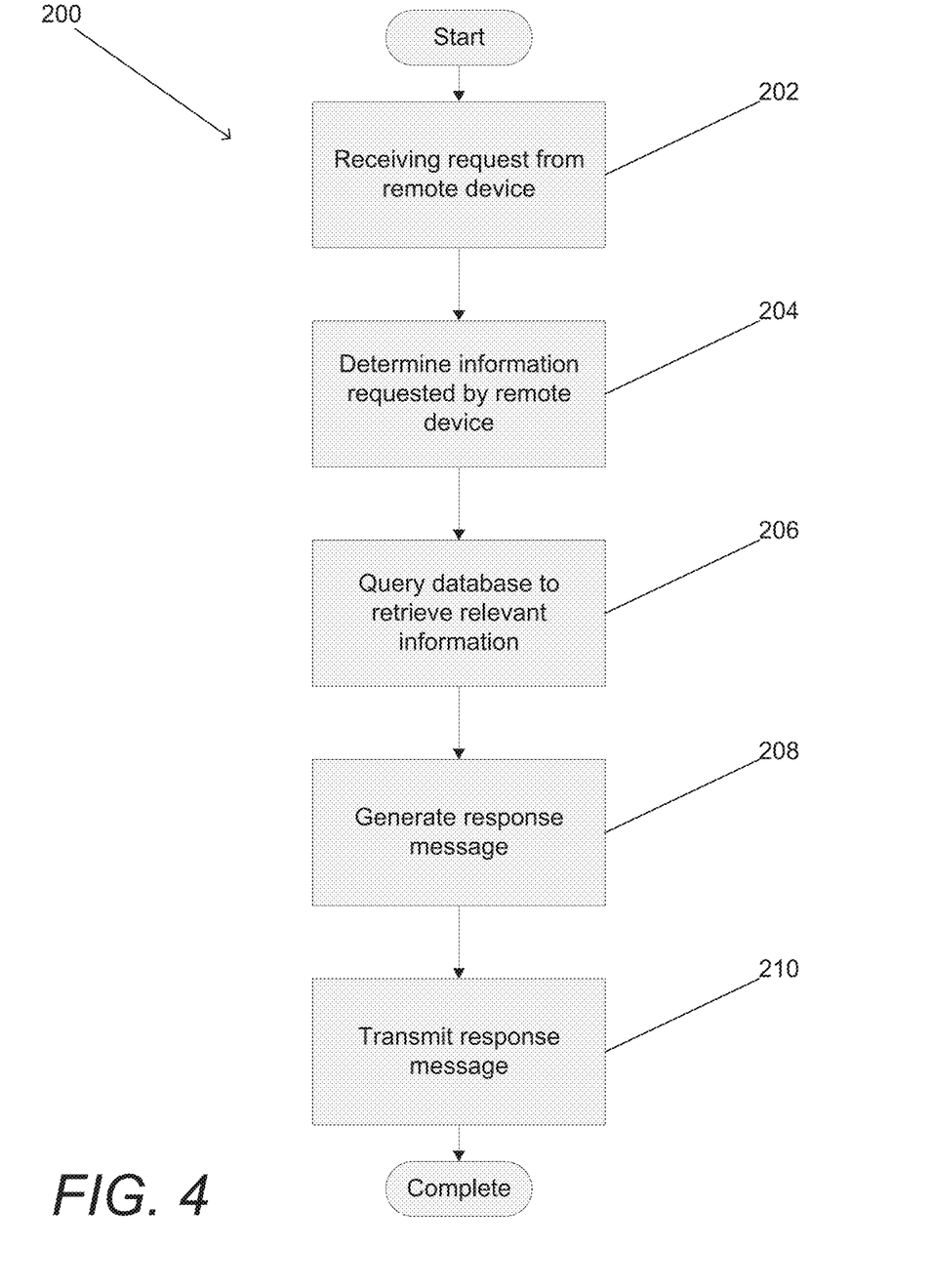
FIG. 4 is a flow chart illustrating a process for retrieving data from a local database of information collected from vehicle devices stored on a vehicle tracking unit in response to a request for information received from a remote device in accordance with an embodiment of the invention.

A process for responding to requests for information received from remote devices via a wireless communication link in accordance with embodiments of the invention is illustrated in FIG. 4. The process 200 includes receiving (202) a request from a remote device. The vehicle tracking unit determines (204) the information (if any) requested by the remote device and, where appropriate, queries (206) the database of vehicle device information to retrieve information that can be utilized in generating a response to the remote device. As noted above, the retrieved information can be a specific piece of information or multiple pieces of information. In addition, the retrieved information can be directly provided to the remote device and/or analyzed to generate information that is provided to the remote device. Once vehicle device information has been retrieved from the database, the vehicle tracking unit generates (208) a response message and transmits (210) the response to the remote device via the wireless link. Although a specific process for responding to requests and/or commands from remote devices is illustrated in FIG. 4, any of a variety of processes appropriate to specific applications can be utilized in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A vehicle tracking unit for a vehicle of a type comprising a vehicle data bus extending throughout the vehicle and at least one operable vehicle device connected thereto, the at least one operable vehicle device responsive to at least one data bus code on the vehicle data bus, the vehicle tracking unit comprising:
 a vehicle position determining device;
 a wireless communications device; and
 a controller spaced apart from the at least one operable vehicle device and connected to the vehicle data bus so that the vehicle data bus extends from said controller to the at least one operable vehicle device;
 wherein the controller is configured to:
  obtain information from the at least one vehicle device via the vehicle data bus and store the information provided by the at least one vehicle device in a database;
  receive requests for information from a remote device via the wireless communications device;
  query the database for the requested information independently of obtaining information from the at least one vehicle device; and
  send the requested information to the remote device via the wireless communications device.

2. The vehicle tracking unit of claim 1, further comprising: memory;
 wherein the controller is configured to store the database in the memory.

3. The vehicle tracking unit of claim 1, wherein the information provided by the at least one vehicle device includes at least one piece of information selected from the group consisting of: Vehicle Speed; Engine Speed; Fuel Rate; Trip Fuel Consumption; Trip Odometer; Ignition Status; Malfunction Indicator Lamp Status; Diagnostic Trouble Codes; Power Take Off Status; Engine Coolant Monitor; Throttle Position; Battery Voltage; A/C System Monitor; Catalyst Monitor; Comprehensive Component Monitor; EGR System Monitor; Evaporative System Monitor; Fuel System Monitor; Heated Catalyst Monitor; Misfire Monitor; Oxygen Sensor Monitor; Oxygen Sensor Heater Monitor; Secondary Air Monitor; Fuel Rate; Trip Fuel Consumption; Battery Voltage; Brake Position/Switch Status; Odometer; Seatbelt Fastened; Cruise Control Status; Fuel Level; Transmission Gear; Turn Signal Status; Accelerator Position; Tire Pressure; Oil Life; Airbag Status; Acceleration/Deceleration; and Vehicle Security Alarm Status.

4. The vehicle tracking unit of claim 1, wherein the controller is configured to obtain data from the at least one vehicle device by periodically querying the at least one vehicle device.

5. The vehicle tracking unit of claim 1, wherein the controller is configured to determine the at least one vehicle device to obtain information from based on a piece of information previously received by the controller.

6. The vehicle tracking unit of claim 1, wherein the request for information from the remote device is a request for a specific piece of information.

7. The vehicle tracking unit of claim 1, wherein the request for information from the remote device is a request for multiple pieces of information.

8. The vehicle tracking unit of claim 1, wherein the request for information from the remote device is a request for a piece of information that is calculated by the controller using information retrieved from the database.

9. The vehicle tracking unit of claim 1, wherein the controller is configured to determine location using the vehicle position determining device and to provide location information to a remote device via the wireless communications device.

10. A vehicle tracking device configured to communicate with at least one vehicle device via a vehicle data bus, comprising:
 a wireless communications device; and
 a controller configured to connect to the vehicle data bus;
 wherein the controller is configured to:
  obtain information from the at least one vehicle device via the vehicle data bus and store the information provided by the at least one vehicle device in a database;
  receive requests for information from a remote device via the wireless communications device;
  query the database for the requested information independently of obtaining information from the at least one vehicle device; and
  send the requested information to the remote device via the wireless communications device.

11. A method of obtaining data from at least one vehicle device connected to a vehicle data bus, comprising:
- obtaining information from the at least one vehicle device using a vehicle tracking device;
- adding information obtained from the at least one vehicle device to a database maintained by the vehicle tracking device;
- receiving a request for information from a remote device via the vehicle tracking device;
- querying the database using the vehicle tracking device to obtain the requested information independently of obtaining information from the at least one vehicle device; and
- sending the requested information to the remote device using the vehicle tracking device.

12. The method of claim 11, wherein the information received from the at least one vehicle device includes at least one piece of information selected from the group consisting of: Vehicle Speed; Engine Speed; Fuel Rate; Trip Fuel Consumption; Trip Odometer; Ignition Status; Malfunction Indicator Lamp Status; Diagnostic Trouble Codes; Power Take Off Status; Engine Coolant Monitor; Throttle Position; Battery Voltage; A/C System Monitor; Catalyst Monitor; Comprehensive Component Monitor; EGR System Monitor; Evaporative System Monitor; Fuel System Monitor; Heated Catalyst Monitor; Misfire Monitor; Oxygen Sensor Monitor; Oxygen Sensor Heater Monitor; Secondary Air Monitor; Fuel Rate; Trip Fuel Consumption; Battery Voltage; Brake Position/Switch Status; Odometer; Seatbelt Fastened; Cruise Control Status; Fuel Level; Transmission Gear; Turn Signal Status; Accelerator Position; Tire Pressure; Oil Life; Airbag Status; Acceleration/Deceleration; and Vehicle Security Alarm Status.

13. The method of claim 11, wherein obtaining data from the at least one vehicle device using a vehicle tracking device comprises periodically querying the at least one vehicle device using the vehicle tracking device.

14. The method of claim 11, wherein obtaining data from at least one vehicle device using the vehicle tracking device comprises determining at least one vehicle device to query based upon a piece of information previously received by the controller.

15. The method of claim 11, wherein the request for information from the remote device is a request for a specific piece of information.

16. The method of claim 11, wherein the request for information from the remote device is a request for multiple pieces of information.

17. The method of claim 11, wherein the request for information from the remote device is a request for a piece of information that is generated by analyzing information retrieved from the database using the vehicle tracking device.

18. The method of claim 11, further comprising:
- determining location using the vehicle tracking device; and
- providing location information to a remote device via the vehicle tracking device.

19. A machine readable medium containing controller instructions, where execution of the instructions by a controller causes the controller to perform a process comprising:
- obtaining information from the at least one vehicle device;
- adding the obtained information from the at least one vehicle device to a database;
- receiving a request for information from a remote device via a wireless communications device;
- querying the database to obtain the requested information independently of obtaining the information from the at least one vehicle device; and
- sending the requested information to the remote device via a wireless communications device.

20. The machine readable medium of claim 19, wherein the machine readable medium is non-volatile memory.

* * * * *